Aug. 3, 1943.  L. OSWALD  2,325,875
LAND LEVELER
Filed Aug. 30, 1941   2 Sheets-Sheet 1

Inventor
Louis Oswald

By Clarence A. O'Brien
Attorney

Aug. 3, 1943.  L. OSWALD  2,325,875
LAND LEVELER
Filed Aug. 30, 1941  2 Sheets-Sheet 2
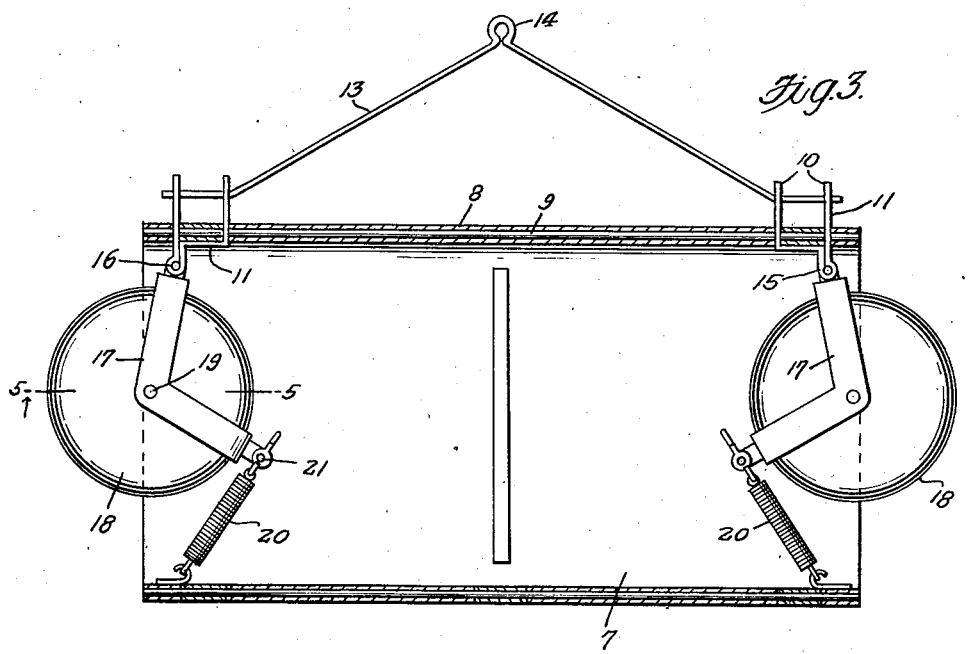
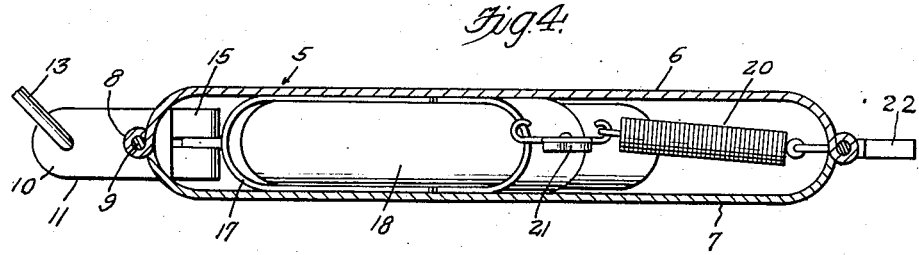
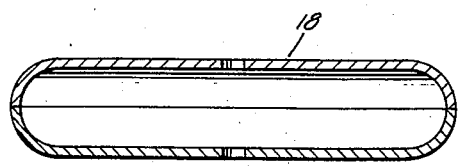
Inventor
Louis Oswald
By Clarence A. O'Brien
Attorney Patented Aug. 3, 1943

2,325,875

UNITED STATES PATENT OFFICE 2,325,875

LAND LEVELER

Louis Oswald, Napa, Calif.

Application August 30, 1941, Serial No. 409,087

5 Claims. (Cl. 55—22)

The present invention relates to new and useful improvements in farm implements and has for its primary object to provide a device adapted to be dragged over the soil after the same has been plowed and harrowed for the purpose of levelling the surface of the soil by removing and crushing clods therefrom. The machine is designed primarily for use in orchards and vineyards prior to the harvesting of the crop in order to provide a smooth walking surface for the gatherers of the crop.

A further important object of the invention is to provide a drag adapted to be drawn over the surface of the soil and embodying yieldable means at each end of the drag adapted to smooth and level the soil immediately adjacent the trees or vines of the vineyard.

A still further object is to provide a device of this character of simple and practical construction, which is efficient and reliable in performance, relatively inexpensive to manufacture, and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which Figure 1 is a top plan view.

Figure 3 is a horizontal sectional view taken substantially on the line 3—3 of Fig. 2.

Fig. 4 is a transverse sectional view taken substantially on the line 4—4 of Fig. 1.

Fig. 5 is a fragmentary sectional view through one of the disks taken substantially on a line 5—5 of Fig. 3.

Figure 1:
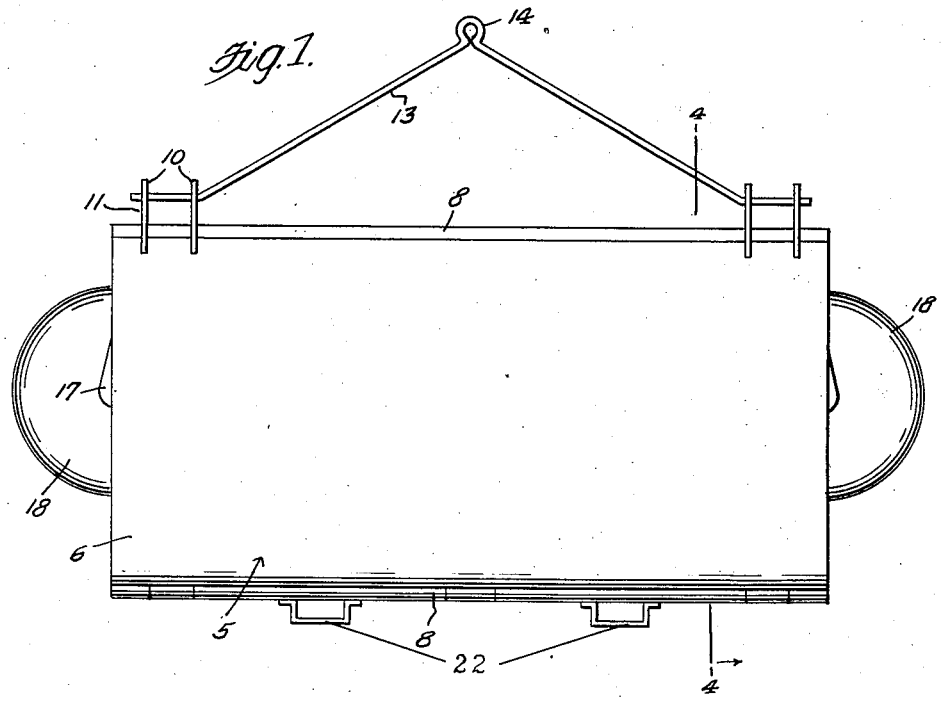
Figure 2:
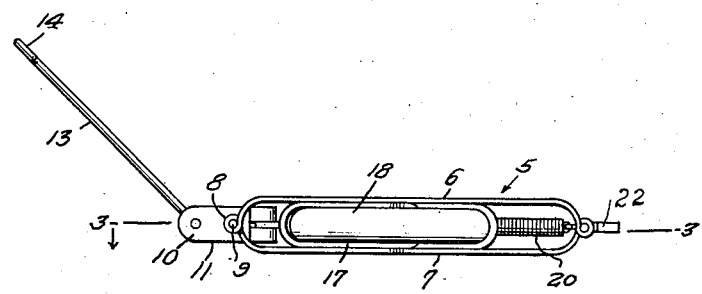
Figure 2 is an end elevational view.
Figure 6:
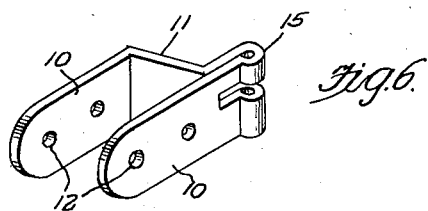
Fig. 6 is a perspective view of one of the brackets to which the disks are pivotally attached.

Referring now to the drawings in detail wherein for the purpose of illustration I have disclosed a preferred embodiment of the invention, the numeral 5 designates the drag or soil leveler generally which is preferably in the form of a flat hollow housing open at each end and constructed of upper and lower sections 6 and 7 respectively. Transversely the drag is of substantially oval shape, as shown more clearly in Fig. 4 of the drawings.

The longitudinal edges of the sections 6 and 7 are rolled as shown at 8 to provide hinged members in which pins 9 are inserted for securing the sections together. For this purpose the hinge sections 8 of the upper and lower sections of the drag are alined in end to end relation to receive the pins 9 and between the hinge sections adjacent the ends of the drag are positioned the spaced parallel arms 10—10 of a pair of bracket members designated at 11, the outer ends of the arms being provided with alined openings 12—12 for receiving the ends of a draw member 13 having an eye 14 at its central portion providing means for attaching the drag to a pulling vehicle. The brackets 11 are of substantially U formation as shown in Fig. 3 of the drawings and the bight portion thereof is provided with apertured ears 15 having a pin 16 positioned therein and on which is pivotally mounted a bell crank mounting 17 having a hollow disk 18 journalled on a pin 19 at the intermediate portion of the mounting. To the other end of the mounting 17 is attached a coiled spring 20 by means of a connector 21, the spring having one end attached to the inside of the drag.

The disks 18 project outwardly at opposite ends of the drag, the spring 20 yieldably maintaining the disks in their outwardly projected position.

From the foregoing it will be apparent that the drag may be drawn over the surface of the soil to remove clods and uneven portions of the soil and thus smooth the surface. The outwardly projecting disks 18 likewise will smooth the soil at the ends of the drag so that the drag may be worked closely under fruit trees, vines, and the like, and the disks are yieldable to impact with the trees or vines so as to prevent injury thereto.

The sections 6 and 7 are of substantially duplicate construction and accordingly the drag may be used in an inverted position to equalize wear on the respective sections.

Handles 22 are provided at the rear edge of the body of the drag.

It is believed the details of construction, advantages and manner of use of the device will be readily understood from the foregoing without further detailed explanation.

What is claimed is:

1. A soil levelling device comprising a substantially flat hollow drag body open at each side edge, and adapted to be drawn over the surface of the ground, and yieldable drag members mounted in the drag body and projecting outwardly from the open edges thereof.

2. A soil levelling device comprising a substantially flat hollow drag body, open at each side edge, and adapted to be drawn over the surface of the ground, auxiliary drag members mounted in the drag body, and spring means yieldably projecting the members outwardly of the body and adapted for retraction upon contact with an object in the path of the members.

3. A soil levelling device comprising a substantially flat hollow drag body open at each end and composed of a pair of substantially duplicate upper and lower sections, means attached to the body for pulling the same over the surface of the ground, a hollow disk-like member mounted horizontally in each end of the body, and spring means normally projecting a portion of the disks outwardly for dragging over the ground, said disks being retracted upon contact thereof with objects in the path of the disks.

4. A soil-working device comprising a drag body of substantially duplicate top and bottom construction adapted for use in inverted positions and a retractible member projecting from an edge of the body for use as a soil-working element when the body is in either position.

5. A soil levelling device comprising a drag body adapted to be drawn over the surface of the ground, a retractible member carried by the body, and means yieldably projecting the member from one edge of the body to form a soil working drag extension, said retractible member being movable into its retracted position inwardly of the edge of the body by contact with objects in the path of the member.

LOUIS OSWALD.